(12) United States Patent
Unton et al.

(10) Patent No.: US 11,796,226 B2
(45) Date of Patent: Oct. 24, 2023

(54) SYSTEM FOR SUPPORTING INTERMITTENT FAST TRANSIENT HEAT LOADS

(71) Applicant: Rolls-Royce North American Technologies Inc., Indianapolis, IN (US)

(72) Inventors: Timothy Unton, Avon, IN (US); Eric Sean Donovan, Fishers, IN (US)

(73) Assignee: ROLLS-ROYCE NORTH AMERICAN TECHNOLOGIES INC., Indianapolis, IN (US)

( * ) Notice: Subject to any disclaimer, the term of this patent is extended or adjusted under 35 U.S.C. 154(b) by 0 days.

(21) Appl. No.: 17/988,008

(22) Filed: Nov. 16, 2022

(65) Prior Publication Data

US 2023/0074039 A1    Mar. 9, 2023

Related U.S. Application Data (62) Division of application No. 17/038,652, filed on Sep. 30, 2020, now Pat. No. 11,530,844.

(51) Int. Cl.
| | |
|---|---|
| F25B 5/04 | (2006.01) |
| F25B 6/04 | (2006.01) |
| F25B 31/00 | (2006.01) |
| F25B 40/02 | (2006.01) |
| F25B 49/02 | (2006.01) |
| F25B 43/00 | (2006.01) |

(52) U.S. Cl.
CPC .................. *F25B 5/04* (2013.01); *F25B 6/04* (2013.01); *F25B 31/006* (2013.01); *F25B 40/02* (2013.01); *F25B 43/00* (2013.01); *F25B 49/027* (2013.01); *F25B 2400/053* (2013.01); *F25B 2500/18* (2013.01); *F25B 2500/28* (2013.01)

(58) Field of Classification Search
CPC .. F25B 5/04; F25B 6/04; F25B 31/006; F25B 40/02; F25B 43/00; F25B 49/027; F25B 2400/053; F25B 2500/18; F25B 2500/28; F25B 25/005
See application file for complete search history.

(56) References Cited

U.S. PATENT DOCUMENTS

| | | | | |
|---|---|---|---|---|
| 3,681,934 A | * | 8/1972 | Tudury | F25B 47/022 62/276 |
| 4,165,037 A | * | 8/1979 | McCarson | F25B 30/02 62/217 |
| 4,554,799 A | | 11/1985 | Pallanch | |

(Continued)

FOREIGN PATENT DOCUMENTS

| | | | |
|---|---|---|---|
| EP | 3553420 A2 | 10/2019 | |
| WO | WO 2015/119903 A1 | 8/2015 | |
| WO | WO-2018155028 A1 * | 8/2018 | ............. F25B 13/00 |

OTHER PUBLICATIONS

WO-2018155028-A1 English Translation (Year: 2018).*

(Continued)

*Primary Examiner* — David J Teitelbaum
(74) *Attorney, Agent, or Firm* — Crowell & Moring LLP (57) ABSTRACT

A heat transfer system for controlling two or more heat loads, including a high transient heat load, is provided. The heat transfer system may include sensible-heat thermal energy storage. A method of transferring heat from two or more heat loads to an ambient environment is further provided.

20 Claims, 5 Drawing Sheets

(56) References Cited

U.S. PATENT DOCUMENTS

| | | |
|---|---|---|
| 2006/0070385 A1* | 4/2006 | Narayanamurthy .... F25D 16/00 |
| | | 62/434 |
| 2014/0047862 A1 | 2/2014 | Tamura et al. |
| 2014/0053597 A1* | 2/2014 | Matsuura ................. F25B 1/00 |
| | | 62/510 |
| 2016/0178243 A1 | 6/2016 | Derosier |
| 2017/0167767 A1 | 6/2017 | Shi et al. |
| 2019/0360730 A1* | 11/2019 | Hagh ..................... F25B 41/39 |
| 2020/0326113 A1 | 10/2020 | Donovan et al. |

OTHER PUBLICATIONS

French Office Action and Written Opinion with English Translation, dated Feb. 2, 2023, pp. 1-16, issued in French Patent Application No. FR210293, Industrial Property Department, Courbevoie Cedex, France.

\* cited by examiner

SYSTEM FOR SUPPORTING INTERMITTENT FAST TRANSIENT HEAT LOADS

CROSS REFERENCE TO RELATED APPLICATIONS

This application is a divisional application of U.S. patent application Ser. No. 17/038,652, filed on Sep. 30, 2020, the contents of which are incorporated herein by reference in their entirety.

TECHNICAL FIELD

This disclosure relates to heat transfer systems, more specifically to a heat transfer system for supporting intermittent fast transient heat loads.

BACKGROUND

Conventional methods of rejecting heat from a refrigerant or cooling system, for example, vapor compression systems or phase change cooling systems, require sizing the heat rejecting component(s), for example, the condenser and fans, for a maximum design heat load at a maximum design rejection temperature. However, many heat loads may operate on a cycle wherein the maximum heat load occurs during only a portion of that cycle. Additionally, the maximum design ambient or heat rejection temperature likely is not always present. Some heat-transfer systems frequently operate the compressor away from its peak efficiency. Further, the compressor must accelerate and decelerate very quickly to keep pace with the real-time load demands of a system, which may otherwise become unstable and fail to maintain a constant temperature refrigerant to the load. Accordingly there remains a need for further contributions in this area of technology.

BRIEF DESCRIPTION OF THE DRAWINGS

The present disclosure may be better understood with reference to the following drawings and description. The components in the figures are not necessarily to scale. Moreover, in the figures, like-referenced numerals designate corresponding parts throughout the different views.

The drawings described herein are for illustration purposes only and are not intended to limit the scope of the present disclosure in any way.

DETAILED DESCRIPTION

According to an example of the present disclosure, a heat transfer system includes a primary fluid flow path configured to deliver a primary fluid disposed in the primary fluid flow path to a primary heat load at a substantially constant temperature. The primary fluid flow path includes a two-phase pump loop ("TPPL"), the TPPL configured to cool the primary heat load, the TPPL including a subcooler upstream of the primary heat load. The primary fluid flow path further includes a vapor compression system ("VCS") loop configured to transfer heat from the primary fluid in the VCS loop to an ambient environment via a first condenser and to a thermal energy storage ("TES") medium via a first heat exchanger. The primary fluid flow path further includes an accumulator configured to separate the primary fluid received from the TPPL and the VCS loop into a vapor-phase primary fluid and a liquid-phase primary fluid, the accumulator in fluid communication with the TPPL and the VCS loop. The primary fluid flow path further includes an evaporator branch comprising the primary fluid and an evaporator and in fluid communication with the TPPL downstream of the accumulator and with the VCS loop upstream of a compressor. A thermal energy storage ("TES") loop comprises the evaporator, a tank, a three-way valve, a TES medium pump, and the first heat exchanger. The TES medium is disposed in the TES loop. The TES loop is configured to, during operation of the heat transfer system, cool a secondary heat load and to transfer heat to the ambient environment via the VCS loop. The subcooler is configured to dissipate heat in the primary fluid in the TPPL.

One interesting feature of the systems and methods described below may be that the heat transfer systems smooth out the heat loads transferred to a compressor of a VCS loop and, therefore, enables such a compressor to operate at a slower ramp rate than would otherwise be required. Alternatively, or in addition, an interesting feature of the systems and methods described below may be that the use of thermal energy storage to cool the secondary heat load enables the compressor to be turned off during long periods of standby so that power is not wasted. Alternatively, or in addition, an interesting feature of the systems and methods described below may be that the differences in temperature between the primary fluid and the TES medium made possible by the heat transfer systems described herein may enable a reduced-size heat exchanger. Alternatively, or in addition, an interesting feature of the systems and methods described below may be that heat loads on an included vapor compression system ("VCS") may be "damped," or reduced in amplitude, advantageously providing a compressor of the VCS more time to ramp up and down. Alternatively, or in addition, an interesting feature of the systems and methods described below may be that the compressor may operate at a more efficient condition during peak heat loads, reducing power draw required by heat transfer systems of the present disclosure.

For purposes of promoting an understanding of the principles of the disclosure, reference will now be made to the examples illustrated in the drawings, and specific language may be used to describe the same. It will nonetheless be understood that no limitation of the scope of the disclosure is intended by the illustration and description of certain examples of the disclosure. In addition, any alterations and/or modifications of the illustrated and/or described example(s) are contemplated as being within the scope of the present disclosure. Further, any other applications of the principles of the disclosure, as illustrated and/or described herein, as would normally occur to one skilled in the art to which the disclosure pertains, are contemplated as being within the scope of the present disclosure.

Figure 1:
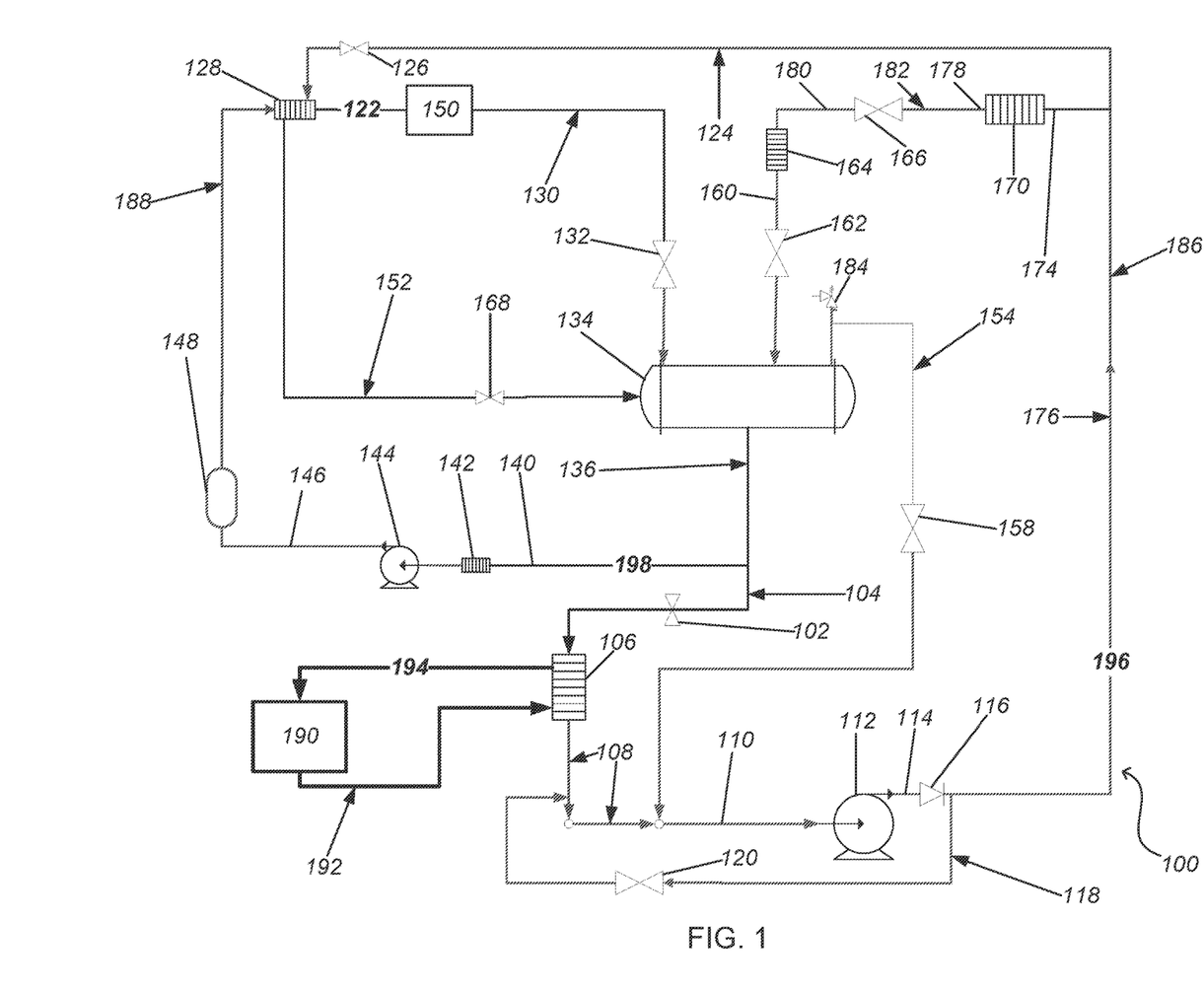
FIG. 1 illustrates a schematic of an example of a heat transfer system configured to cool a high transient heat load.

FIG. 1 illustrates a schematic of an example of a heat transfer system 100 configured to cool a primary heat load 150 that may be an intermittent high transient heat load and a secondary heat load 190 that may be a steady-state load. The example of the heat transfer system 100 includes a primary fluid flow path 122 having a primary fluid disposed therein. The primary fluid flow path 122 may include one or more loops that are in fluid communication with one another. For example, primary fluid flow path includes a vapor compression system ("VCS") loop 186 and a two-phase pump loop ("TPPL" or "TPP loop") 188. Each loop includes various components configured to transfer heat from one location and dispose of, or reject, the heat into another location. For example, various components of VCS loop 186 include a heat exchanger 164, a compressor 112, and a condenser 170. Primary fluid flow path 122, and specifically, VCS loop 186, may include VCS loop flow path 196 arranged in a loop and including the various components listed above such that each subsequent component, as listed in the order above, may be located downstream of the prior components, and the effluent of the condenser 170 ultimately being returned to heat exchanger 164 after the primary fluid flows around VCS loop 186.

Each of the above various components forming the primary fluid flow path 122 and/or VCS loop flow path 196 may be in fluid communication with, and/or coupled to, one another via one or more conduits. For example, an outlet 160 of heat exchanger 164 may be in fluid communication with, and/or coupled to, an inlet 110 of compressor 112 by a heat-exchanger-compressor conduit 154; an outlet 114 of compressor 112 may be in fluid communication with, and/or coupled to, an inlet 174 of condenser 170 by a compressor-condenser conduit 176; and an outlet 178 of the condenser 170 may be in fluid communication with, and/or coupled to, an inlet 180 of the heat exchanger 164 by a condenser-heat-exchanger conduit 182.

Primary fluid flow path 122 and/or VCS loop 186 may include additional components and/or conduits, some of which are described herein. Primary fluid flow path 122 and/or VCS loop 186 may form a closed fluid flow path, meaning that the heat transfer system 100 is designed such that the primary fluid does not intentionally enter or leave primary fluid flow path 122 during normal operation. Being characterized as closed does not prohibit, however, primary fluid from being added to or removed from primary fluid flow path 122 to make up for leaks, change of the primary fluid after fluid degradation, or for some other maintenance or repair procedure. Alternatively, primary fluid flow path 122 and/or VCS loop flow path 196 may be open if a valve may be modulated open so that primary fluid flows to optional conduits within the system, thereby forming a larger, ultimately closed flow path.

The primary fluid disposed within primary fluid flow path 122 is any appropriate fluid, including a vapor, a liquid, and/or a vapor-liquid mixture that is capable of achieving the desired heat transfer. For example, the primary fluid may be water or a refrigerant. The particular primary fluid for heat transfer system 100 may be dependent upon the heat load and the temperature of the environments/systems that transfer heat into or out of the heat transfer system 100.

Heat exchanger 164 may be any suitable type of heat exchanger for transferring heat out of the primary fluid, which runs in hot-side channels (or tubes or other appropriate geometry) of heat exchanger 164. Examples of heat exchanger 164 may include a parallel-flow, cross-flow, multi-pass-flow, or counter-flow heat exchanger. Heat exchanger 164 may be a condenser that condenses a portion, or, alternatively, all, of the primary fluid flowing therein. Heat exchanger 164 may include a series of conduits in fluid association with, and/or thermally coupled to, a heat source or heat load, including, for example, a primary heat load 150, which is not a fluid. For example, conduits of heat exchanger 164 may be placed in thermal proximity, contact, fluid association, or coupling with a solid structure that produces heat such that this heat is transferred out of and removed from the primary fluid. Alternatively, heat exchanger 164 may thermally couple (not shown) primary fluid flow path 122 to thermal energy storage ("TES") loop 192.

TES loop 192 includes TES loop flow path 194 and secondary heat load 190 disposed on TES loop 192. TES loop 192 includes additional components and conduits configured to temporarily store heat from primary heat load 150. One example of additional components and conduits included in TES loop 192 are illustrated by TES loop 450 in FIG. 4. A TES medium may be disposed in TES loop 192.

Referring back to FIG. 1, the heat transfer from the primary fluid via heat exchanger 164 may be from primary heat load 150, which may be a variable load or high transient heat load, and/or heat load from compressor 212. Primary heat load 150 may be above a more common low power load for only a portion of time. Unlike the heat transfer system 100 shown in FIG. 1, a conventional heat transfer system would be sized based on the peak heat load.

Compressor 112 raises the pressure of the primary fluid. This increase in pressure may be used to provide the workflow required to circulate the primary fluid within the primary fluid flow path 122. Raising the pressure of the primary fluid may also raise the temperature of the primary fluid, thereby allowing heat to be rejected from the primary fluid in condenser 170. An example of compressor 112 may include a device configured to pressurize a gas.

Condenser 170 receives the higher-temperature/pressure primary fluid from the compressor 112. Condenser 170 may be a heat exchanger that rejects heat from the primary fluid to a heat sink which may be, for example, the ambient environment. Examples of condenser 170 may include a parallel-flow, counter-flow, multi-pass-flow, or cross-flow heat exchanger. The primary fluid may run in hot-side channels of condenser 170. Cold-side channels of condenser 170 may be filled with a fluid from a heat sink, for example, ambient air. Condenser 170 may be a gas cooler.

In some examples, condenser 170 may be sized such that condenser 170 may be insufficient to condense all of the primary fluid flowing therethrough when heat input and compressor 112 power and heat input is sufficiently larger than heat output; in other words, condenser 170 may be "undersized". A person of ordinary skill will recognize that the energy inputted into heat transfer system 100 must be rejected at some point for the heat transfer system 100 to continue effective operation. If condenser 170 is undersized relative to the maximum ambient temperature that the heat transfer system 100 may encounter as a means to reduce the overall size of the heat transfer system 100, the outlet 178 of condenser 170 may contain a primary fluid that is a mixture of liquid and vapor. Heat exchanger 164 may be used to transfer heat from the primary fluid to the heat exchanger 164.

Condenser 170 may include a force ventilation unit (not shown in FIG. 1), such as a fan, which increases the flow rate of the heat sink over condenser 170. The "sizing" of the condenser 170 may factor in the addition of the forced ventilation unit. Condenser 170 may also include pumps for rejecting heat, for example, to sea water.

Compressor 112 may operate at a high temperature relative to heat exchanger 164, which may be a sensible-heat TES heat exchanger. A large difference in temperature across heat exchanger 164 may significantly reduce the size of heat exchanger 164 relative to, for example, a phase-change material ("PCM")-based heat exchanger.

The primary fluid flow path 122 of heat transfer system 100 additionally includes a two-phase pump loop ("TPPL") 188 including TPPL flow path 198 including cooling conduit 136. Cooling conduit 136 includes, in the order of flow, a subcooler 142, a liquid pump 144, and a preheater 128. Cooling conduit 136 may fluidly communicate and/or couple accumulator 134 to preheater 128 with subcooler 142 and liquid pump 144 disposed on the cooling conduit 136 between accumulator 134 and preheater 128. Primary fluid flows into cooling conduit 136 and through an inlet 140 of subcooler 142 into hot-side channels of subcooler 142. Primary fluid flowing through hot-side channels of subcooler 142 rejects heat to fluid flowing in cold-side channels of subcooler 142. Alternatively, and/or additionally, subcooler 142 is thermally coupled to TES loop 450 (shown in FIG. 4), and primary fluid flowing through hot-side channels of subcooler 142 rejects heat to a TES medium disposed in TES loop 450. By rejecting heat, the subcooler 142 reduces the temperature of the primary fluid flowing through the cooling conduit 136.

Subcooler 142 may be any device capable of cooling primary fluid in cooling conduit 136. Subcooler 142 includes an inlet 140 and an outlet. Examples of subcooler 142 may include a tube-in-tube, shell-and-tube, parallel-flow, cross-flow, multi-pass-flow, or counter-flow heat exchanger. Subcooler 142 may include a series of conduits in fluid association with, and/or thermally coupled to, a heat source or heat load, including, for example, a primary heat load 150, which is not a fluid. For example, conduits of subcooler 140 may be placed in thermal proximity, contact, fluid association, or coupling with a solid structure that produces heat such that this heat is transferred out of and removed from the primary fluid. Alternatively, subcooler 142 may thermally couple (not shown) primary fluid flow path 122 to TES loop 192.

Primary fluid leaving subcooler 142 flows to liquid pump 144, which is downstream from subcooler 142 and disposed on cooling conduit 136. Liquid pump 144 may raise the pressure of the primary fluid and may provide workflow to move the primary fluid downstream within the cooling conduit 136. Liquid pump 144 may include a liquid pump inlet and a liquid pump outlet. The liquid pump inlet of liquid pump 144 may be in fluid communication with, and/or coupled to, the outlet of subcooler 142.

Primary fluid leaving liquid pump 144 may flow to filter drier inlet 146 to filter drier 148, which may be downstream from liquid pump 144 and disposed on cooling conduit 136. Filter drier 148 may remove contaminants, including, but not limited to, moisture, dirt, acid, solder flux, beads, and/or filings, from primary fluid in the cooing conduit 136. The filter drier inlet 146 to the filter drier 148 may be in fluid communication with, and/or coupled to, the liquid pump outlet of the liquid pump 144. Filter drier 148 includes a filter drier outlet.

Primary fluid leaving filter drier 148 may flow to preheater 128, which may be downstream from filter drier 148. Preheater 128 includes a preheater inlet and a preheater outlet, and may additionally have a second preheater inlet and a second preheater outlet. The preheater inlet to preheater 128 may be in fluid communication with, and/or coupled to, the filter drier outlet of the filter drier 148. The primary fluid in the cold-side channels of preheater 128 is warmed by the fluid in the hot-side channels of preheater 128, raising the temperature of the primary fluid in the cooling conduit 136 in the direction of saturation temperature. Preheater 128 may increase the temperature of the primary fluid flowing in the cooling conduit 136 to a set point temperature in order to provide a determined amount of subcooling. Primary fluid flow path 122 and TPPL 188 may additionally include preheater-accumulator conduit 130 disposed between preheater 128 and accumulator 134. Primary heat load 150 may be disposed on preheater-accumulator conduit 130 downstream of preheater 128 and upstream of accumulator 134. TPPL 188 includes cooling conduit 136 and preheater-accumulator conduit 130. The primary fluid leaving preheater 128 may be preheated with vapor-phase-enriched primary fluid flowing through compressor-condenser-conduit-preheater conduit 124. Compressor-condenser-conduit-preheater conduit 124 may be a branch from primary fluid flow path 122 that may be upstream of inlet 174 to condenser 170 and that may be supplied by outlet 114 from compressor 112. TPPL 188 may further include return conduit 152 disposed between preheater 128 and accumulator 134.

Primary fluid flow path 122 further includes accumulator 134. Accumulator 134 may be disposed in heat-exchanger-compressor conduit 154 downstream of outlet 160 of heat exchanger 164. Additionally, accumulator 134 may be disposed such that cooling conduit 136 is downstream of and in fluid communication with an outlet from accumulator 134. Accumulator 134 may be a reservoir that performs one or more functions in heat transfer system 100, including, but not limited to: providing a surge volume of primary fluid to cooling conduit 136; providing pump head to liquid pump 144; separating two-phase (for example, vapor-liquid) mixtures of the primary fluid into vapor-phase and liquid-phase primary fluid, the liquid-phase primary fluid flowing into cooling conduit 136, and the vapor-phase primary fluid flowing into heat-exchanger-compressor conduit 154. Liquid-phase primary fluid leaving preheater 128 may flow into accumulator 134 along preheater-accumulator conduit 130, which includes primary heat load 150, for subsequent reuse in cooling conduit 136. Accumulator 134 may include one or more accumulator inlets and one or more accumulator outlets.

Evaporator 106 includes an evaporator inlet and an evaporator outlet. The evaporator inlet may be in fluid communication with, and/or coupled to, and downstream of evaporator-branch valve 102 on evaporator branch 104. Evaporator branch 104 may combine with heat-exchanger-compressor conduit 154 in inlet 110 to compressor 112.

The conduits of heat transfer system 100 may include valves disposed within the conduits at preferable locations. For example, compressor-condenser conduit 176 may include compressor-condenser-conduit valve 116. Examples of compressor-condenser-conduit valve 116 may include a check valve disposed downstream of outlet 114 from compressor 112. Condenser-heat-exchanger conduit 182 may include condenser-heat-exchanger conduit valve 166 disposed downstream of outlet 178 from condenser 170 and upstream of inlet 180 to heat exchanger 164. Examples of condenser-heat-exchanger-conduit valve 166 may include an in-line valve, a gate valve, an in-line gate valve, a manual operated valve, a pneumatic valve, a motor valve, and/or a hydraulic valve. Heat-exchanger-compressor conduit 154 may include heat-exchanger-compressor-conduit first valve 162 and heat-exchanger-compressor-conduit second valve 158. Heat-exchanger-compressor-conduit first valve 162 may be disposed between outlet 160 from heat exchanger 164 and accumulator 134, and heat-exchanger-compressorconduit second valve 158 may be disposed between accumulator 134 and inlet 110 to compressor 112. Examples of each of heat-exchanger-compressor-conduit first valve 162 and heat-exchanger-compressor-conduit second valve 158 may include an in-line valve, a gate valve, an in-line gate valve, a manual operated valve, a pneumatic valve, a motor valve, and/or a hydraulic valve. Heat-exchanger-compressor conduit 154 may further include heat-exchanger-compressor-conduit third valve 184 disposed between accumulator 134 and heat-exchanger-compressor-conduit second valve 158. Examples of heat-exchanger-compressor-conduit third valve 184 may include a safety valve or a pressure relief valve.

The vapor-bypass conduit 118 may include vapor-bypass-conduit valve 120. Examples of vapor-bypass-conduit valve 120 may include an in-line valve, a gate valve, an in-line gate valve, a manual operated valve, a pneumatic valve, a motor valve, and/or a hydraulic valve.

The compressor-condenser-conduit-preheater conduit 124 may include compressor-condenser-conduit-preheater-conduit valve 126. Examples of compressor-condenser-conduit-preheater-conduit valve 126 may include an in-line valve, a gate valve, an in-line gate valve, a manual operated valve, a pneumatic valve, a motor valve, and/or a hydraulic valve.

The preheater-accumulator conduit 130 may include preheater-accumulator-conduit valve 132. Examples of preheater-accumulator-conduit valve 132 may include an in-line valve, a gate valve, an in-line gate valve, a manual operated valve, a pneumatic valve, a motor valve, and/or a hydraulic valve.

The return conduit 152 may include return-conduit valve 168. Examples of return-conduit valve 168 may include an in-line valve, a gate valve, an in-line gate valve, a manual operated valve, a pneumatic valve, a motor valve, and/or a hydraulic valve.

During operation, when the heat transfer system 100 encounters primary heat load 150 that is a variable load or high transient heat load, evaporator-branch valve 102 may be modulated or completely closed, and suction pressure entering compressor 112 increases to, for example, its maximum suction pressure. As a result, the pressure ratio across compressor 112 will decrease, thereby increasing the amount of flow the compressor 112 may introduce to the primary fluid. When evaporator-branch valve 102 is closed, primary fluid may not flow from cooling conduit 136 into evaporator branch 104. Evaporator branch 104 may draw the primary fluid from cooling conduit 136 upstream of inlet 140 to subcooler 142. Accordingly, when evaporator-branch valve 102 is closed or modulated, primary fluid does not flow to evaporator 106 or through evaporator branch 104. Examples of evaporator-branch valve 102 may include an in-line valve, a gate valve, an in-line gate valve, a manual operated valve, a pneumatic valve, a motor valve, and/or a hydraulic valve.

When evaporator-branch valve 102 is modulated or completely closed, primary fluid may flow through heat-exchanger-compressor conduit 154 and inlet 110 into compressor 112 at increased temperature and increased suction pressure, increasing VCS cooling efficiency. Accordingly, compressor 112 quickly increases suction pressure as primary heat load 150 may result in more vapor-phase primary fluid in accumulator 134 from outlet 160 of heat exchanger 164, thereby allowing compressor 112 to operate more efficiently. The primary fluid leaving compressor 112 through outlet 114, which has increased pressure and may have increased temperature, may be, at least in part, diverted back to evaporator conduit 104 at conduit section 108, which is downstream of evaporator 106 and upstream of inlet 110 to compressor 112, by vapor-bypass conduit 118. Vapor-bypass conduit 118 may allow primary fluid in vapor form to bypass the compressor-condenser conduit 176 located downstream of outlet 114 of compressor 112. Vapor-bypass conduit 118 may enter evaporator branch 104 at conduit section 108, upstream of inlet 110 to compressor 112.

Heat transfer system 100 may provide benefits superior to conventional heat transfer systems as a result of the configuration of primary fluid flow path 122 when heat transfer system 100 responds to primary heat load 150 and secondary thermal load 190. In response to an increase in primary heat load 150, evaporator-branch valve 102 closes, and the inlet pressure to compressor 112 may substantially increase. Consequently, flowrate of the primary fluid may increase, and/or compressor 112 speed may increase, in a quick manner. The liquid-phase primary fluid in the accumulator 134 may recycle through TPPL 188, including cooling conduit 136 and preheater-accumulator conduit 130. At the same time, any vapor-phase primary fluid may be separated from the liquid-phase primary fluid in the accumulator 134 and cycled through VCS loop 186 to condenser 170 and heat exchanger 164 until the heat transfer system 100 sufficiently responds to primary heat load 150 and cools primary heat load 150. Evaporator-branch valve 102 may then be opened, such that primary fluid may flow from accumulator 134 to evaporator 106 to assist the cooling of secondary heat load 190 and rechilling of the TES medium. The energy to cool the secondary heat load may be supplied entirely by the energy stored in a thermal energy storage device (not shown) of the TES loop 192 during the response of the heat transfer system 100 to primary heat load 150. Alternatively, evaporator-branch valve 102 may remain closed, such that the primary fluid flows through heat exchanger 164, which rechills the TES medium (the coupling between heat exchanger 164 and TES loop 192 is not shown in FIG. 1 in order to simplify FIG. 1). It may be expected that the temperature difference between the TES medium flowing into secondary heat load 190 and vapor-phase primary fluid flowing from condenser 170 may advantageously be very large, which may allow for heat exchanger 164 to be very small. Alternatively, or in addition, heat transfer system 100 may advantageously allow for modification of operation of compressor 112 so as to optimize efficiency of heat transfer system 100.

Figure 2:
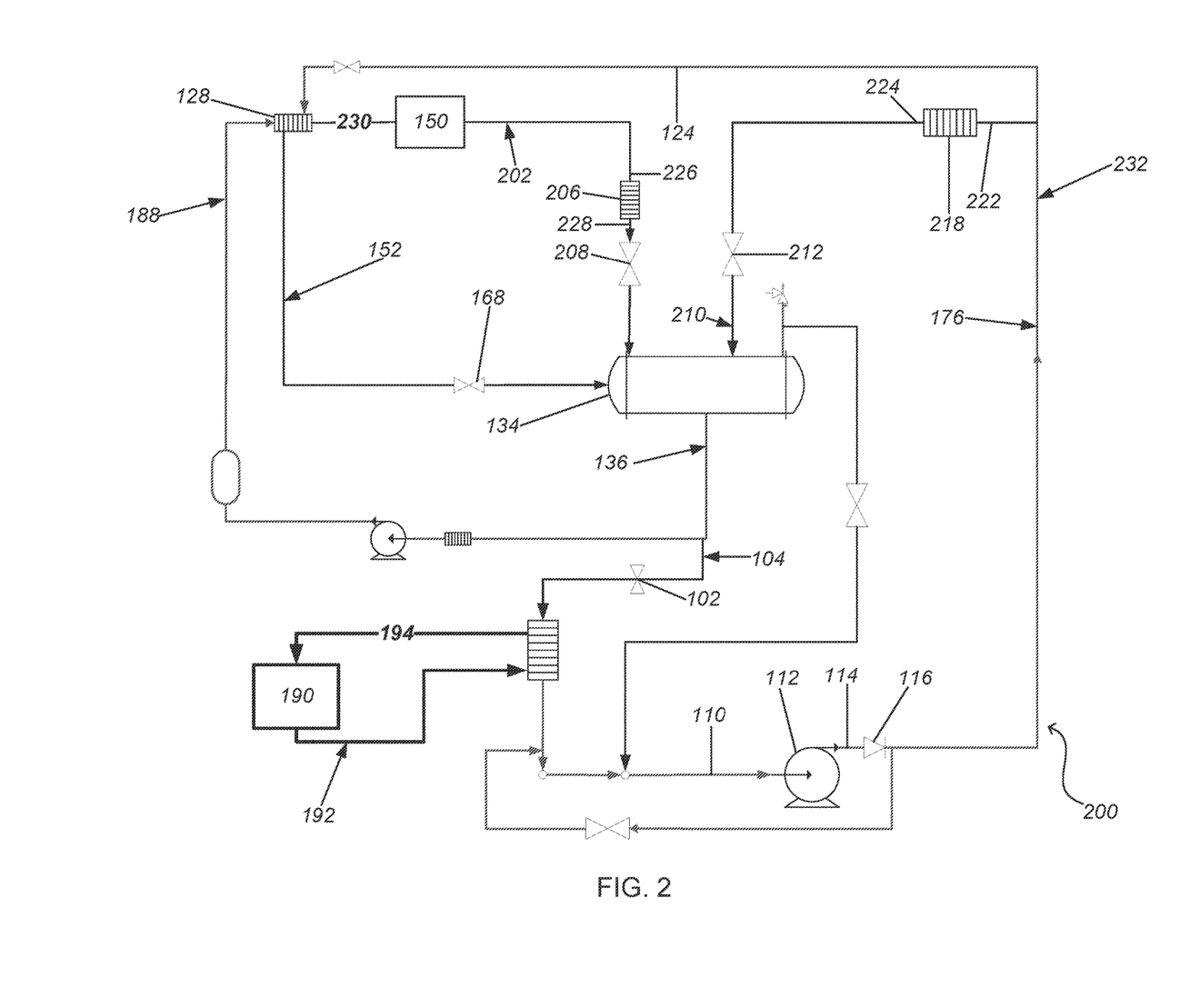
FIG. 2 illustrates a schematic of another example of a heat transfer configured to cool high transient heat load.

FIG. 2 illustrates a schematic of another example of a heat transfer system 200 configured to cool primary thermal load 150 and secondary heat load 190. Heat transfer system 200 includes many of the same components performing the same functions as those described herein elsewhere. Primary differences between heat transfer systems 100 and 200 include preheater-heat-exchanger-accumulator conduit 202 in TPPL 188 in heat transfer system 200 disposed between preheater 128 and accumulator 134. Additionally, primary differences between heat transfer systems 100 and 200 include condenser-compressor conduit 210 disposed between condenser 218 and compressor 112 in VCS loop 232 in heat transfer system 200, in place of condenser-heat-exchanger conduit 182 and heat-exchanger-compressor conduit 154 shown in primary fluid flow path 122 of heat transfer system 100 in FIG. 1.

In heat transfer system 200, primary fluid flow path 230 and VCS loop 232 do not include condenser-heat-exchanger conduit 182 and heat-exchanger-compressor conduit 154 shown in FIG. 1. Instead, primary fluid flow path 230 in FIG. 2 includes a compressor-condenser conduit 176 and a condenser-compressor conduit 210 in VCS loop 232. Each of the conduits forming the primary fluid flow path 230 may be in fluid communication with, and/or coupled to, one another. For example, the outlet 224 of condenser 218 may be in fluid communication with, and/or coupled to, the inlet 110 of compressor 112 via the condenser-compressor conduit 210; and the outlet 114 of the compressor 112 may be in fluid communication with, and/or coupled to, the inlet 222 of the condenser 218 by the compressor-condenser conduit 176. Condenser-compressor conduit 210 may further include accumulator 134 disposed between the outlet 224 of the condenser 218 and inlet 110 to the compressor 112.

Condenser 218 receives the higher-temperature/pressure primary fluid from the compressor 112 via compressor-condenser conduit 176. Condenser 218 may be a heat exchanger that rejects heat from the primary fluid to a heat sink which may be, for example, the ambient environment. Examples of condenser 218 may include a parallel-flow, counter-flow, multi-pass-flow, or cross-flow heat exchanger. The primary fluid may run in hot-side channels of condenser 218. Cold-side channels of condenser 218 may be filled with a fluid from a heat sink, for example, ambient air, or sea-water.

Primary fluid flow path 230 further includes preheater-heat-exchanger-accumulator conduit 202 in TPPL 188 disposed between preheater 128 and accumulator 134, in addition to return conduit 152. Preheater-heat-exchanger-accumulator conduit 202 includes primary heat load 150 downstream of preheater 128. Preheater-heat-exchanger-accumulator conduit 202 further includes heat exchanger 206, with inlet 226 and outlet 228, downstream of primary heat load 150 and upstream of accumulator 134. It is expected that heat exchanger 206 may allow compressor 112 to move at slower ramp rates.

Heat exchanger 206 may be a heat exchanger of a suitable type for transferring heat out of the primary fluid, which runs in hot-side channels (or tubes or other appropriate geometry) of heat exchanger 206, and into a TES medium, which runs in cold-side channels of heat exchanger 206. Heat exchanger 206 may be a heat sink. Examples of heat exchanger 206 may include a parallel-flow, cross-flow, multi-pass-flow, or counter-flow heat exchanger. Heat exchanger 206 may be or include a condenser that condenses a portion, or, alternatively, all, of the primary fluid flowing therein. Heat exchanger 206 may include a series of conduits, in fluid association with, and/or thermally coupled to, a heat sink, including, for example, primary heat load 150, which is not a fluid. For example, conduits of heat exchanger 206 may be placed in thermal proximity, contact, fluid association, or coupling with a solid structure that produces heat, such as primary heat load 150 that is a high transient, such that this heat is transferred into and removed by the primary fluid. Heat may be transferred from heat exchanger 206 to a TES medium, which may be a coolant, and which may run in cold-side channels of heat exchanger 206.

By rejecting heat to a coolant, heat exchanger 206 may gradually increase the liquid-phase content of the primary fluid used to cool primary heat load 150 rather than experiencing a rapid jump from, for example, approximately 0% of vapor-phase primary fluid to more than approximately 50% of vapor-phase primary fluid. As shown in FIG. 2, heat exchanger 206 may reduce the thermal load imposed by primary heat load 150 by transferring heat from the primary fluid to heat exchanger 206 and from heat exchanger 206 to a TES medium, which may be a coolant (the thermal connection between heat exchanger 206 and TES loop 192 is not shown in FIG. 2 for simplicity). The primary fluid may be subcooled and then expanded through the liquid distribution pressure drop. Primary fluid is preheated in preheater 128 before flowing to primary thermal load 150 so as to allow for a pressure drop for liquid distribution while responding to primary heat load 150. The preheating in preheater 128 further may set up the inlet condition to closely control the boiling temperature of the primary fluid while responding to primary heat load 150.

Condenser-compressor conduit 210 of VCS loop 232 may include condenser-compressor-conduit valve 212 disposed downstream of outlet 224 from condenser 218. Condenser-compressor-conduit valve 212 may further be disposed upstream of accumulator 134. Examples of condenser-compressor-conduit valve 212 may include an in-line valve, a gate valve, an in-line gate valve, a manual operated valve, a pneumatic valve, a motor valve, and/or a hydraulic valve. Preheater-heat-exchanger-accumulator conduit 202 of TPPL 188 may include preheater-heat-exchanger-accumulator-conduit valve 208, disposed downstream of heat exchanger 206 and upstream of accumulator 134. Examples of preheater-heat-exchanger-accumulator-conduit valve 208 may include an in-line valve, a gate valve, an in-line gate valve, a manual operated valve, a pneumatic valve, a motor valve, and/or a hydraulic valve.

During operation, when the heat transfer system 200 encounters primary heat load 150 that is a variable load or high transient heat load, evaporator-branch valve 102 may be modulated to a partially open position or to be completely closed, and suction pressure entering compressor 112 increases to, for example, its maximum suction pressure. As a result, the pressure ratio across compressor 112 will decrease, thereby increasing the flow compressor 112 introduces to the primary fluid.

Figure 3:
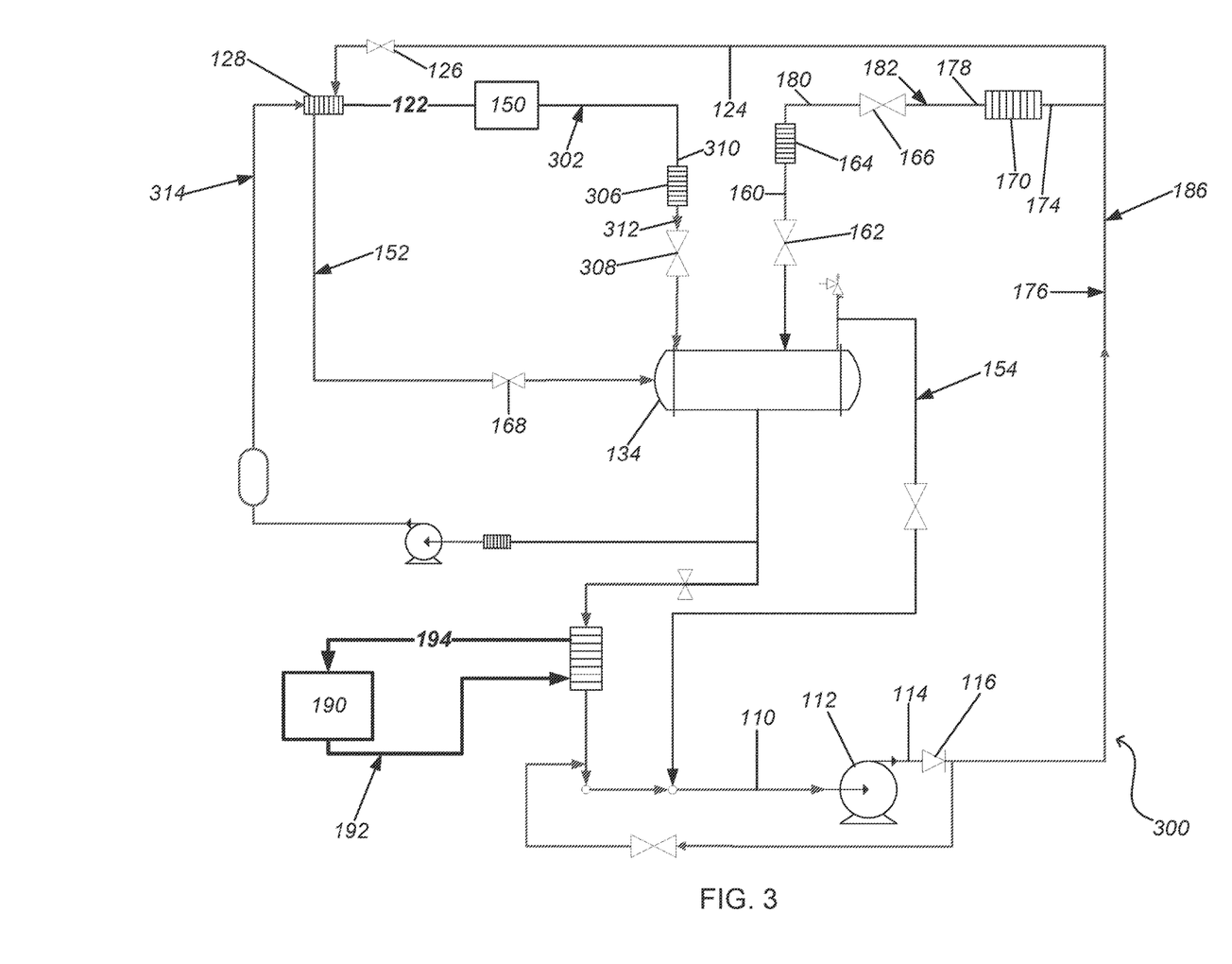
FIG. 3 illustrates a schematic of yet another example of a heat transfer configured to cool high transient heat load.

FIG. 3 illustrates a schematic of yet another example of a heat transfer system 300 configured to cool primary heat load 150 and secondary heat load 190. Heat transfer system 300 includes many of the same components performing the same functions as those described herein elsewhere. Primary differences between heat transfer systems 100 and 300 include preheater-heat-exchanger-accumulator conduit 302 in primary fluid flow path 122 and TPPL 314 of heat transfer system 300, disposed between preheater 128 and accumulator 134.

Preheater-heat-exchanger-accumulator conduit 302 includes heat exchanger 306 with inlet 310 and outlet 312. It is expected that heat exchanger 306 may allow compressor 112 to move at slower ramp rates.

Heat exchanger 306 may be a heat exchanger of suitable type for transferring heat out of the primary fluid, which runs in hot-side channels (or tubes or other appropriate geometry) of heat exchanger 306, and into a TES medium, which runs in cold-side channels of heat exchanger 306. Heat exchanger 306 may be a heat sink. Examples of heat exchanger 306 may include a parallel-flow, cross-flow, multi-pass-flow, or counter-flow heat exchanger. Heat exchanger 306 may be or include a condenser that condenses a portion, or, alternatively, all, of the primary fluid flowing therein. Heat exchanger 306 may include a series of conduits, in fluid association with, and/or thermally coupled to, a heat sink, including, for example, primary heat load 150, which is not a fluid. For example, conduits of heat exchanger 306 may be placed in thermal proximity, contact, fluid association, or coupling with a solid structure that produces heat, such as primary heat load 150 that is a high transient, such that this heat is transferred into and removed by the primary fluid. Heat may be transferred from heat exchanger 306 to a TES medium, which may be a coolant, and which may run in cold-side channels of heat exchanger 306. Preheater-heatexchanger-accumulator conduit 302 may include preheater-heat-exchanger-accumulator-conduit valve 308. Preheater-heat-exchanger-accumulator-conduit valve 308 may be disposed in preheater-heat-exchanger-accumulator conduit 302 downstream of outlet 312 of heat exchanger 306 and upstream of accumulator 134. Examples of preheater-heat-exchanger-accumulator-conduit valve 308 may include an in-line valve, a gate valve, an in-line gate valve, a manual operated valve, a pneumatic valve, a motor valve, and/or a hydraulic valve. As shown in FIG. 3, heat exchanger 306 may be used cooperatively with heat exchanger 164.

During operation, when rejecting heat to a TES medium, heat exchanger 306 may gradually increase the liquid-phase content of the primary fluid used to cool primary heat load 150 rather than experiencing a rapid jump from, for example, approximately 0% of vapor-phase primary fluid to more than approximately 50% of vapor-phase primary fluid. Heat exchanger 164 may be used to reject heat from the primary fluid to a TES medium by transferring heat from the primary fluid to heat exchanger 164 and from heat exchanger 164 to the TES medium, so as to further condense the primary fluid, while heat exchanger 306 gradually increases the liquid-phase content of the primary fluid used to cool primary heat load 150.

Figure 4:
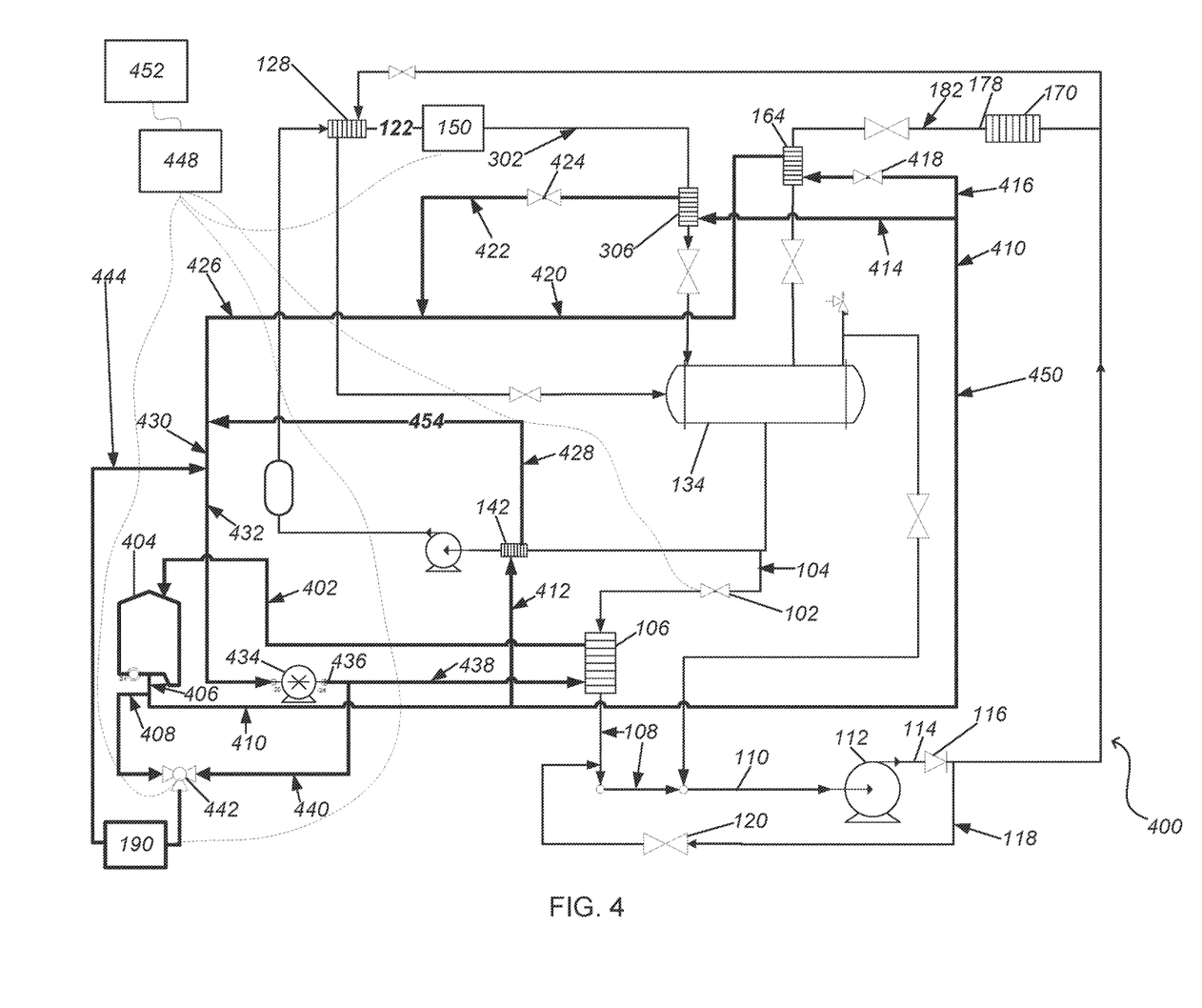
FIG. 4 illustrates a schematic of yet another example of a heat transfer system configured to cool a high transient heat load and a secondary heat load that includes an example of a TES loop including the secondary heat load.

FIG. 4 illustrates a schematic of yet another example of a heat transfer system 400 configured to cool primary heat load 150 that is a variable load or high transient heat load and secondary thermal load 190. Heat transfer system 400 includes many of the same components performing the same functions as those described herein elsewhere. Heat transfer system 400 further includes additional components compared to heat transfer systems 100, 200, and 300.

A TES medium may be disposed on TES loop 450, which includes evaporator 106. Evaporator 106 thermally couples primary fluid flow path 122 and/or 230 to TES loop 450. TES loop 450 includes tank 404, three-way valve 442, and TES medium pump 434. TES loop 450 is configured to, during operation of heat transfer system 100, cool secondary heat load 190.

Tank 404 may include a tank inlet, a tank outlet, and one or more sensors to detect depth, volume, and/or temperature of the TES medium in tank 404 at one or more respective set points.

TES medium pump 434 may raise the pressure of the primary fluid and move the primary fluid downstream within TES loop 450. Liquid pump 434 may include a TES medium pump inlet and TES medium pump outlet 436.

In some examples, the TES medium may include one or more of propylene glycol, ethylene glycol, water, or any mixture thereof. Additionally, the TES medium may include one or more additives that will be understood as beneficial to a person of ordinary skill. The TES medium may be in liquid phase during operation of heat transfer systems of the present disclosure, and the TES medium may have a liquid-phase to vapor-phase transition temperature higher than the liquid-phase-to-vapor-phase transition temperature of the primary fluid.

TES loop 450 includes evaporator-tank conduit 402 and pump-evaporator conduit 438. Evaporator-tank conduit 402 may fluidly associate, and/or couple, together evaporator 106 and tank 404.

TES loop 450 includes tank-subcooler-heat-exchanger conduit 410 and tank-outlet-three-way-valve conduit 408. Tank-subcooler-heat-exchanger conduit 410 may fluidly associate, and/or couple, tank 404 to each of subcooler-inlet conduit 412, and first-heat-exchanger-inlet conduit 416, and second-heat-exchanger-inlet conduit 414 on TES loop 450.

Subcooler-inlet conduit 412 may fluidly associate, and/or couple, together tank-subcooler-heat-exchanger conduit 410 and subcooler 142. Second-heat-exchanger-inlet conduit 414 may fluidly associate, and/or couple, together tank-subcooler-heat-exchanger conduit 410 and heat exchanger 306. First-heat-exchanger-inlet conduit 416 may fluidly associate, and/or couple, together tank-subcooler-heat-exchanger conduit 410 and heat exchanger 164.

TES loop 450 may include first-heat-exchanger-outlet conduit 420 and second-heat-exchanger-outlet conduit 422. Though not illustrated in FIG. 4, TES loop 450 may not include, in some examples, first-heat-exchanger-inlet conduit 416 and first-heat-exchanger-outlet conduit 420 where, as in primary fluid flow path 230, heat exchanger 164 is not included.

First-heat-exchanger-outlet conduit 420 may fluidly associate, and/or couple, heat exchanger 164 and second-heat-exchanger-outlet conduit 422. TES loop 450 may further include combined-heat-exchanger-outlet conduit 426. First-heat-exchanger-outlet conduit 420 and second-heat-exchanger-outlet conduit 422 may be fluidly associated, and/or coupled, together downstream of heat exchangers 164 and 306 in combined-heat-exchanger-outlet conduit 426. TES loop 450 may further include subcooler-outlet conduit 428. TES loop 450 may further include combined-heat-exchanger-subcooler-outlet conduit 430. Combined-heat-exchanger-outlet conduit 426 and subcooler-outlet conduit 428 may be fluidly associated, and/or coupled, together downstream of subcooler 142 in combined-heat-exchanger-subcooler-outlet conduit 430.

TES loop 450 further includes three-way-valve-combined-outlet conduit 444 and combined-outlet conduit 432. Secondary heat load 190 may be disposed on three-way-valve-combined-outlet conduit 444. Secondary heat load 190 may be a steady-state heat load. Combined-heat-exchanger-subcooler-outlet conduit 430 may be fluidly associated, and/or coupled, together with three-way-valve-combined-outlet conduit 444 and both combined-heat-exchanger-subcooler-outlet conduit 430 and three-way-valve-combined-outlet conduit 444 may be fluidly associated, and/or coupled, with combined-outlet conduit 432. Combined-outlet conduit 432 may be fluidly associated with, and/or coupled to, TES medium pump 434. TES medium pump outlet 436 may be fluidly associated with, and/or coupled to, evaporator 106 via pump-evaporator conduit 438.

TES loop 450 may further include pump-outlet-three-way-valve conduit 440. Three-way valve 442 may be fluidly associated with, and/or coupled to, TES medium pump outlet 436 of TES medium pump 434 via pump-outlet-three-way-valve conduit 442.

First-heat-exchanger-inlet-conduit valve 418 may be disposed in first-heat-exchanger-inlet conduit 416 upstream of heat exchanger 164. Second-heat-exchanger-outlet-conduit valve 424 may be disposed in second-heat-exchanger-outlet conduit 422 downstream of heat exchanger 306. Examples of each of first-heat-exchanger-inlet-conduit valve 418 and second-heat-exchanger-outlet-conduit valve 424 may include an in-line valve, a gate valve, an in-line gate valve, a manual operated valve, a pneumatic valve, a motor valve, and/or a hydraulic valve.

During operation, TES medium may flow through TES medium flow path 454 from evaporator 106 through evaporator-tank conduit 402 to tank 404. The TES medium may flow from tank 404 through outlet 406 of tank 404 to tank-subcooler-heat-exchanger conduit 410 and tank-outlet-three-way-valve conduit 408. The TES medium may flow through tank-subcooler-heat-exchanger conduit 410 and subcooler-inlet conduit 412 to provide TES medium to subcooler 142 so as to cool subcooler 142. Additionally, the TES medium may flow through tank-subcooler-heat-exchanger conduit 410 and second-heat-exchanger-inlet conduit 414 to provide the TES medium to heat exchanger 306 so as to cool heat exchanger 306 and transfer heat to the TES medium. Alternatively, though not shown in FIG. 4, the TES medium may flow through second-heat-exchanger-inlet conduit 414 to provide the TES medium to heat exchanger 206 so as to cool heat exchanger 206 and transfer heat to the TES medium. Additionally, TES medium may flow through tank-subcooler-heat-exchanger conduit 410 and first-heat-exchanger-inlet conduit 416 to provide the TES medium to heat exchanger 164 so as to cool heat exchanger 164 and transfer heat to the TES medium.

Elevated-temperature TES medium may flow from heat exchanger 164 through first-heat-exchanger-outlet conduit 420. Additionally, elevated-temperature TES medium may flow from heat exchanger 306 through second-heat-exchanger-outlet conduit 422. Elevated-temperature TES medium effluent that flows through first-heat-exchanger-outlet conduit 420 and second-heat-exchanger-outlet conduit 422 may flow together through combined-heat-exchanger-outlet conduit 426. Elevated-temperature TES medium may flow from subcooler 142 through subcooler-outlet conduit 428. Elevated-temperature TES medium effluent that flows through combined-heat-exchanger-outlet conduit 426 and subcooler-outlet conduit 428 may flow together through combined-heat-exchanger-subcooler-outlet conduit 430.

Elevated-temperature TES medium effluent that flows through combined-heat-exchanger-subcooler-outlet conduit 430 and three-way-valve-combined-outlet conduit 444 may flow together through combined-outlet conduit 432. Elevated-temperature TES medium effluent may flow through combined-outlet conduit 432 to TES medium pump 434, which may increase the pressure of elevated-temperature TES medium effluent as it leaves pump 434 through TES medium pump outlet 436 of TES medium pump 434. The elevated-pressure and elevated-temperature TES medium effluent may flow from TES medium pump outlet 436 of TES medium pump 434 through pump-evaporator conduit 438 to evaporator 106 to be cooled. Elevated-pressure and elevated-temperature TES medium effluent may flow from TES medium pump outlet 436 of TES medium pump 434 through pump-outlet-three-way-valve conduit 440. Advantageously, cooled TES medium flowing from outlet 406 of tank 404 through tank-outlet-three-way-valve conduit 408 may mix with elevated-pressure and elevated-temperature TES medium effluent flowing from outlet 436 of pump 434 through pump-outlet-three-way-valve conduit 440 at three-way valve 442 so as to maintain a controlled temperature for the TES medium as it responds to secondary heat load 190. Mixed TES medium may flow from three-way valve 442 through three-way-valve-combined-outlet conduit 444, respond to secondary heat load 190, and join TES medium effluent flowing through combined-heat-exchanger-subcooler-outlet conduit 430.

When compressor 112 has sufficient capacity evaporator-branch valve 102 may modulate to an open or partially open position to expand primary fluid down and provide cooled liquid-phase primary fluid from accumulator 134 to evaporator branch 104 and evaporator 106. The expanded primary fluid may provide cooling to the TES medium in evaporator 106. TES chilling may occur when primary heat load 150 is either off or at a low state. First-heat-exchanger-inlet-conduit valve 418 and second-heat-exchanger-outlet-conduit valve 424 may be closed during the TES chilling state. When there is a large primary heat load 150, first-heat-exchanger-inlet-conduit valve 418 and second-heat-exchanger-outlet-conduit valve 424 may be modulated open while evaporator-branch valve 102 may be modulated partially open or closed. Once the TES medium has been heated and primary heat load 150 decreases, first-heat-exchanger-inlet-conduit valve 418 and second-heat-exchanger-outlet-conduit valve 424 may be closed to reinitiate the recharge/chilling state. After the TES has been chilled, compressor 112 may decelerate during the transition to normal state operation, and subsequently turn off, when the TES medium reaches a temperature at or below a predetermined temperature set point such that the average or steady-state heat loads, which may include secondary heat load 190, may be managed and cooled by the stored sensible heat energy in the TES medium in tank 434. By using stored sensible heat energy in the TES medium to cool secondary heat load 190 during normal state operation of heat transfer system 400, which may often proceed at a lower temperature than in response to primary heat load 150, the compressor 112 may advantageously raise inlet pressure and, consequently, temperature, further than in the absence of using stored sensible heat energy in the TES medium when primary heat load 150 increases. Accordingly, use of stored sensible heat energy in the TES medium to cool secondary heat load 190 may advantageously increase the overall efficiency of the system.

Examples of the heat transfer systems of the present disclosure may additionally include memory 452 and processor 448 (shown in FIG. 4).

Processor 448 may be in communication with memory 452 and a network interface (not shown in FIGS. 1 through 5). In one example, processor 448 may also be in communication with additional elements, such as a display (not shown in FIGS. 1 through 5). Examples of processor 448 may include a controller, a general processor, a central processing unit, a microcontroller, a server, an application specific integrated circuit ("ASIC"), a digital signal processor, a field programmable gate array ("FPGA"), a digital circuit, and/or an analog circuit.

Processor 448 may be one or more devices operable to execute logic. The logic may include computer executable instructions or computer code embodied in memory 452 or in other memory that, when executed by processor 448, cause processor 448 to perform the features implemented by the logic. The computer code may include instructions executable with processor 448.

The processing capability of heat transfer systems of the present disclosure may be distributed among multiple entities, such as among multiple processors and memories, optionally including multiple distributed processing systems.

The processor 448 may advantageously control each of valves 102, 116, 120, 126, 132, 158, 162, 166, 208, 212, 308, 418, 424, and/or 442 of the heat transfer systems of the present disclosure separately to position the valves open, partially open, or closed as necessarily, desirable, or preferable. Processor 448 may advantageously control each of compressor 112, liquid pump 144, and/or pump 434 to switch any pump or compressor on or off, and/or increase or decrease speed and/or power to any pump or compressor. Processor 448 may advantageously control and/or monitor one or more set points and/or sensors, such as a predetermined temperature set point and/or temperature sensor, in each of accumulator 134 and/or tank 404 to advantageously implement various predetermined routines.

Figure 5:
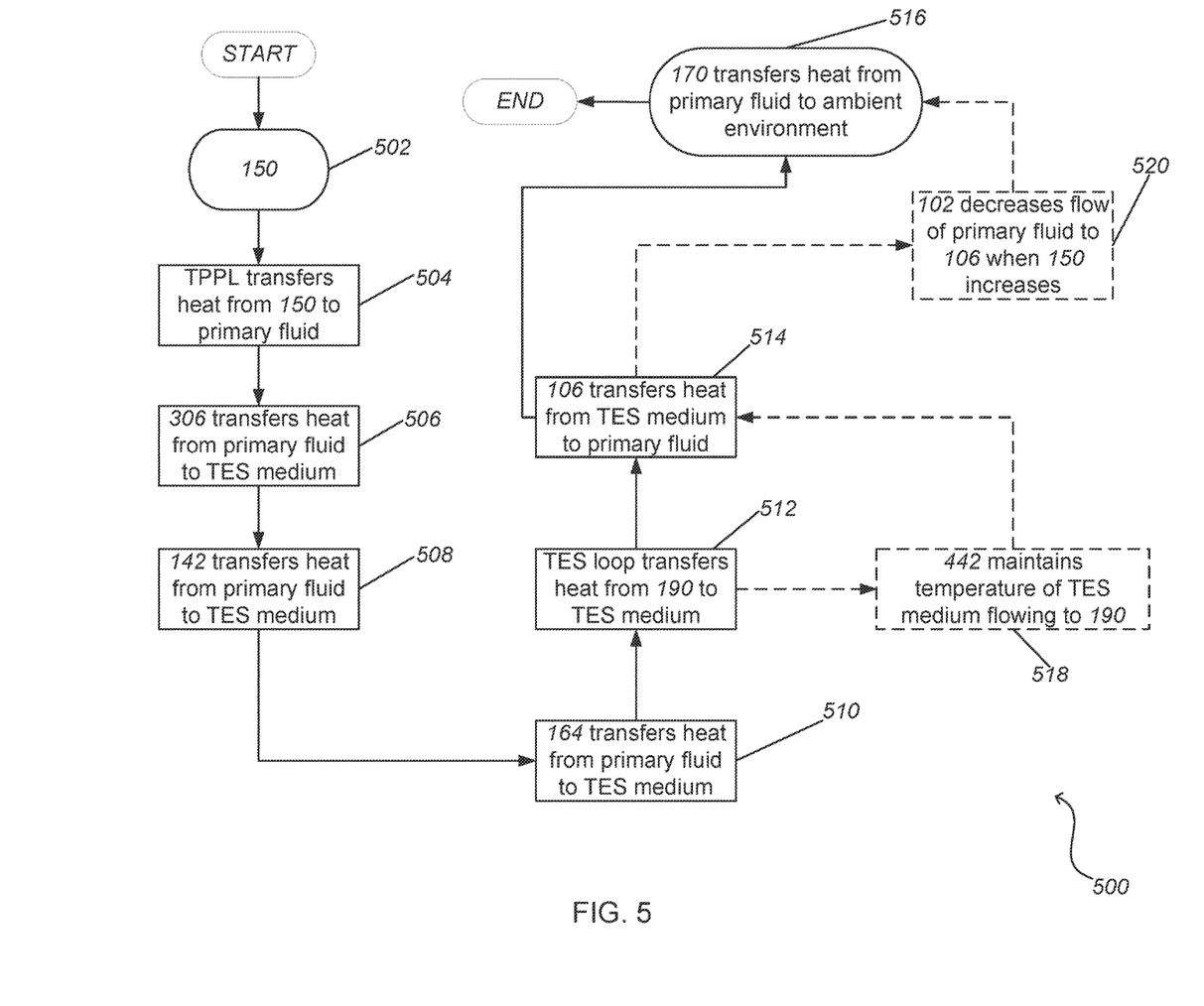
FIG. 5 illustrates an example of a flow diagram of operations in a heat transfer system for cooling a high transient heat load and a secondary heat load.

FIG. 5 illustrates an example of flow diagram 500 of operations of a heat transfer system. Flow diagram 500 illustrates only one example of operations of a heat transfer system. Operations of a heat transfer system may include more, less, or different steps than illustrated by flow diagram 500, and may become more complex than flow diagram 500. Start 502 of flow diagram 600 may be at primary thermal load 150. Processes 504, 506, 508, 510, 512, and 514 may be performed in any sequence, and all or some of processes 504, 506, 508, 510, 512, and 514 may be performed simultaneously. Process 504 may be that TPPL 188 transfers heat from primary thermal load 150 to the primary fluid. Process 506 may be that heat exchanger 306, which may be a condenser, transfers heat from the primary fluid to the TES medium. Process 508 may be that subcooler 142 transfers heat from the primary fluid to the TES medium. Process 510 may be that heat exchanger 164 transfers heat from the primary fluid to the TES medium. Process 512 may be that TES loop 450 transfers heat from secondary heat load 190 to the TES medium. Process 514 may be that evaporator 106 transfers heat from the TES medium to the primary fluid. End 516 may be that condenser 170 transfers heat from the primary fluid to an ambient environment. In some examples, process 520 may be that three-way valve 442 maintains the temperature of the TES medium flowing from secondary heat load 190. In other examples, process 520 may be that valve 102 decreases flow of the primary fluid to evaporator 106 when primary heat load 150 increases.

The operations illustrated in flow diagram 500 may include additional, different, more, or fewer operations than illustrated. The operations may be performed in a different order than illustrated.

The terms "subcool," "subcooling," and "subcooled," as used herein, unless stated otherwise, alone or in combination with other terms, refer to the phenomenon of a liquid at a temperature below its normal boiling point. For example, as understood by a person of ordinary skill, at standard atmospheric pressure, water boils at 373 K. At room temperature, which may refer to approximately 298 K, the water may be referred to as 'subcooled." The term "subcooler," as used herein, unless stated otherwise, alone or in combination with other terms, refers to a device or instrument that may be implemented in a heat transfer system of the present disclosure for the purposes of rejecting heat from a primary fluid at or below its normal boiling point so as to provide subcooled primary fluid.

The terms "modulate," "modulated," and "modulating," as used herein, unless stated otherwise, alone or in combination with other terms, refer to adjusting, varying, or tempering the setting on a valve such that the valve is advantageously positioned between fully open and fully closed.

In examples of the present disclosure, the term "partially open," as used herein, unless stated otherwise, alone or in combination with other terms, may refer to any position of a valve between the position of being completely open (for example, 100% open) and completely closed (for example, 0% open). A partially open position may advantageously vary by example. A partially open position, in certain examples, may be such position such that a valve may advantageously increase or decrease pressure in fluid to a small degree, and/or advantageously increase or decrease temperature in fluid to a small degree, and/or advantageously increase or decrease fluid flow to a small degree. Such partially open positions providing specific advantageous pressure and/or temperature and/or flow conditions to fluid as necessary, desirable, or preferable may be understood by a person of ordinary skill.

A heat transfer system of the present disclosure may regulate dissipation of multiple thermal loads. In some examples, the multiple thermal loads may arise during operation of an apparatus. A heat transfer system of the present disclosure allows for heat dissipation or rejection of multiple thermal loads that may arise in many applications, including applications involving an apparatus operated with high energy consumption. The heat arising during the operation of such an apparatus may be transient or steady-state and transferred into the heat transfer system by any means known in the art, including, but not limited to, using a two-phase pump ("TPP") loop ("TPPL," or "TPP loop"), a fluid or fluid mixture system, or an air conditioning system in conjunction with any type of fluid, coolant, or refrigerant.

A "steady-state" heat load or thermal load, as used herein, unless stated otherwise, alone or in combination with other terms, may refer to a heat load or thermal load that dissipates a substantially constant amount of thermal energy to a heat transfer system during operation of the heat transfer system or during a substantial portion of the operation of the heat transfer system.

For the purpose of this disclosure, the phrase "substantially constant," with respect to temperature, describes a temperature condition that is stable and exhibits minimal variation, such as within a predetermined tolerance. The predetermined tolerance may be, for example, ±5° C., ±3° C., ±1° C., or ±0.5° C. Alternatively, the predetermined tolerance may mean that the substantially constant temperature stays within a predetermined percentage of a constant temperature, such as within 1, 2, 3, or 5 percent of the constant temperature. For the purpose of this disclosure, the phrase "substantial portion" may mean at least 50 percent.

In response to a variable or high transient heat load, a heat transfer system of the present disclosure may change operation. The term "transient state," as used herein, unless stated otherwise, alone or in combination with other terms, refers to a heat transfer system of the present disclosure operating in response to a variable or high transient or transient heat load or thermal load. A "variable" or "high transient" or "transient" heat load or thermal load, as used herein, unless stated otherwise, alone or in combination with other terms, refers to a load that temporarily increases in thermal energy as a function of time, relative to a more common low power load. The term "low power load" simply means lower power than a peak of the transient load. In various examples of a heat transfer system of the present disclosure, a variable or high transient or transient heat load or thermal load may represent a load that temporarily increases in thermal power at least 10%; at least 30%; at least 50%; at least 75%; at least 100%; at least 200%; at least 400%; at least 800%; at least 1000%; at least 2000%; at least 3000%; at least 4000%; at least 5000%; at least 6000%; at least 7000%; at least 8000%; at least 9000%; at least 10000% relative to a more common low power load.

The term "duty cycle," as used herein, unless stated otherwise, alone or in combination with other terms, refers to the duration of a variable or high transient or transient heat load or thermal load as a percent of the total time of a complete cycle, as represented by the percentage of a period of time, during which a heat transfer system is at high power relative to the total time of the high power and low power conditions. One period of time is the duration of the total time of the high power and low power conditions. In various examples of a heat transfer system of the present disclosure, a duty cycle is less than 5%; less than 10%; less than 15%;

less than 20%; less than 25%; less than 30%; less than 40%; less than 50%; less than 60%; less than 70%; less than 80%; less than 90%.

The thermal loads dissipated by the heat transfer system may be at different temperatures. In some examples, the heat loads may include a primary heat load in the form of heat arising from an apparatus, and a second heat load in the form of one of a housekeeping heat load required to operate the apparatus, and/or platform heat loads, and/or heat loads associated with conditioning, distributing, or converting energy. The heat loads associated with conditioning, distributing, or converting energy include, but are not limited to, heat loads associated with power electronics, batteries, electric machines, or control systems. In other examples, a primary heat load is at a higher temperature than a secondary heat load. In further examples, a secondary heat load is a steady-state heat load or thermal load.

The design of the heat transfer systems of the present disclosure allows for control of the fluid or fluid mixture temperature, the flow of the fluid or fluid mixture, or both, depending upon the requirements of the application. The design also provides thermal energy storage ("TES"), such that the heat transfer system may be a practical, operable, and package-able solution when an application requires the use of a TPPL to remove heat from a high-energy system and has one or more housekeeping, secondary, or steady-state loads that use a different fluid and/or are at a different temperature.

The following description is merely exemplary in nature and is in no way intended to limit the present disclosure or its application or uses. The incorporation and use of such a heat transfer system in industrial and military applications that include any apparatus, device, or combination of apparatuses or devices that consume electricity and may benefit from cooling and/or heating are contemplated to be within the scope of the present disclosure. Several examples of such an apparatus or device includes, without limitation, solid state electronics, a light-emitting diode ("LED"), an analog circuit, a digital circuit, a computer, a server, a server farm, a data center, a hoteling circuit such as vehicle electronics, a vehicle such as an aircraft, a directed-energy weapon, a laser, a plasma weapon, a railgun, a microwave generator, a pulse-powered device, a satellite uplink, an electric motor, an electric device, or the like.

The term "ambient environment" may refer to space immediately adjacent to and/or surrounding a heat transfer system of the present disclosure. Alternatively, or in addition, the term "ambient environment" may refer to space outside of a heat transfer system of the present disclosure that is thermally coupled to at least one component of the heat transfer system. The term "ambient temperature" may refer to the temperature of the air or other fluid in the ambient environment.

For the purpose of this disclosure, the terms "about" and "substantially" are used herein with respect to measurable values and ranges due to expected variations known to those skilled in the art (for example, limitations and variability in measurements).

In describing elements of the present disclosure, the ordinal number terms $1^{st}$, $2^{nd}$, "first," "second," and the like, may be used herein. These ordinal number terms are only used to distinguish one element from another element, but do not limit the corresponding elements irrespective of the nature or order of the corresponding elements.

In describing elements of the present disclosure, the terms "upstream" and "downstream" refer to the relative direction with respect to fluid flow in a fluid pathway. For example, "upstream" refers to the direction from which the fluid flows, and "downstream" refers to the direction to which the fluid flows.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various examples have been described, it will be apparent to those of ordinary skill in the art that many more implementations are possible. Accordingly, the examples described herein are not the only possible implementations.

All methods and operations described herein may be performed in any suitable order unless otherwise indicated herein or otherwise clearly contradicted by context.

The subject-matter of the disclosure may also relate, among others, to the following aspects:

A first aspect relates to a heat transfer system, comprising: a primary fluid flow path configured to deliver a primary fluid disposed in the primary fluid flow path to a primary heat load at a substantially constant temperature, the primary fluid flow path comprising: a two-phase pump loop ("TPPL"), the TPPL configured to cool the primary heat load, the TPPL comprising a subcooler upstream of the primary heat load; a vapor compression system ("VCS") loop configured to transfer heat from the primary fluid in the VCS loop to an ambient environment via a first condenser and to a thermal energy storage ("TES") medium via a first heat exchanger; an accumulator configured to separate the primary fluid received from the TPPL and the VCS loop into a vapor-phase primary fluid and a liquid-phase primary fluid, the accumulator in fluid communication with the TPPL and the VCS loop; and an evaporator branch comprising the primary fluid and an evaporator and in fluid communication with the TPPL downstream of the accumulator and with the VCS loop upstream of a compressor; wherein a TES loop comprises the evaporator, a tank, a three-way valve, a TES medium pump, and the first heat exchanger, wherein the TES medium is disposed in the TES loop; wherein the TES loop is configured to, during operation of the heat transfer system, cool a secondary heat load and to transfer heat to the ambient environment via the VCS loop; and wherein the subcooler is configured to dissipate heat in the primary fluid in the TPPL.

A second aspect relates to the heat transfer system of aspect 1, wherein the TPPL is thermally coupled to the TES loop by the subcooler; and wherein the TES loop is configured to, during operation of the heat transfer system, transfer heat from the primary fluid in the TPPL to the ambient environment via the VCS loop.

A third aspect relates to the heat transfer system of any preceding aspect, wherein the TES loop further comprises the subcooler.

A fourth aspect relates to the heat transfer system of aspect 1, wherein the TPPL further comprises a second condenser downstream of the primary heat load and upstream of the accumulator; wherein the TPPL is thermally coupled to the TES loop by the second condenser; and wherein the TES loop is configured to, during operation of the heat transfer system, transfer heat from the primary fluid in the TPPL to the ambient environment via the VCS loop.

A fifth aspect relates to the heat transfer system of any preceding aspect, wherein the TPPL is thermally coupled to the TES loop by the second condenser and by the subcooler; and wherein the TES loop further comprises the second condenser and the subcooler.

A sixth aspect relates to the heat transfer system of any preceding aspect, wherein the TES loop further comprises a TES medium flowpath from the evaporator and returning to the evaporator, the TES medium flowpath comprising, in a direction of TES medium flow: the tank, the first heat exchanger, and the TES medium pump; and wherein the TES medium flowpath further comprises the three-way valve and the secondary heat load, both of which are downstream of the tank and upstream of the TES medium pump.

A seventh aspect relates to the heat transfer system of aspect 6, wherein the TES medium flowpath comprises, in a direct of TES medium flow: the tank, the first heat exchanger and the subcooler in parallel, and the TES medium pump.

An eighth aspect relates to the heat transfer system of aspect 6, wherein the TES medium flowpath comprises, in a direction of TES medium flow: the tank, the first heat exchanger and the second condenser and the subcooler in parallel, and the TES medium pump.

A ninth aspect relates to the heat transfer system of any preceding aspect, wherein the three-way valve is configured to mix the TES medium flowing from the tank with the TES medium flowing from the first heat exchanger and to control the temperature of the TES medium flowing to the secondary heat load.

A tenth aspect relates to the heat transfer system of any preceding aspect, wherein the primary fluid flow path comprises a valve on the evaporator branch upstream of the evaporator, and wherein the valve is configured to decrease flow of the primary fluid to the evaporator when the primary heat load increases.

An eleventh aspect relates to the heat transfer system of any preceding aspect, wherein the tank comprises a predetermined temperature set point; and wherein a compressor in the VCS loop is configured to be turned off when the TES medium in the tank cools to a temperature at or below the predetermined temperature set point.

A twelfth aspect relates to a method of transferring heat from one or more heat loads to an ambient environment, comprising: delivering a primary fluid at a substantially constant temperature disposed in a two-phase pump loop ("TPPL") to a primary heat load; transferring heat from the primary heat load to the primary fluid; transferring heat from the primary fluid to a first condenser in the TPPL; transferring heat from the primary fluid to a thermal energy storage ("TES") medium via a first heat exchanger, the TES medium disposed in a TES loop, a vapor compression system ("VCS") loop comprising the first heat exchanger, wherein the VCS loop is in fluid communication with the TPPL; transferring heat from a secondary heat load to the TES medium in the TES loop; transferring heat from the TES medium to the primary fluid via an evaporator in an evaporator branch, the evaporator branch downstream of and in fluid communication with the TPPL, the evaporator branch upstream of and in fluid communication with the VCS loop; and transferring heat from the primary fluid to the ambient environment via a second condenser in the VCS loop, the second condenser upstream of the first heat exchanger.

A thirteenth aspect relates to the method of aspect 12, wherein the transferring heat from the primary fluid to the first condenser comprises: transferring heat from the primary fluid in the TPPL to the TES medium; wherein the TPPL is thermally coupled to the TES loop by the first condenser.

A fourteenth aspect relates to the method of aspect 12, further comprising: transferring heat from the primary fluid in the TPPL to the TES medium via a subcooler in the TPPL, the subcooler downstream of the accumulator; wherein the TPPL is thermally coupled to the TES loop by the subcooler.

A fifteenth aspect relates to the method of any of aspects 12 to 14, wherein the TPPL is thermally coupled to the TES loop by the subcooler and the first condenser.

A sixteenth aspect relates to the method of any of aspects 12 to 15, further comprising: mixing the TES medium flowing from a tank in the TES loop with the TES medium flowing from the first heat exchanger to control the temperature of the TES medium flowing to the secondary heat load.

A seventeenth aspect relates to the method of any of aspects 12 to 16, further comprising: decreasing flow of the primary fluid through a valve on the evaporator branch upstream of the evaporator when the primary heat load increases.

An eighteenth aspect relates to the method of any of aspects 12 to 17, further comprising: turning off a compressor in the VCS loop when the TES medium in the tank cools to a temperature at or below a predetermined temperature set point.

A nineteenth aspect relates to a heat transfer system, comprising: a thermal energy storage ("TES") loop comprising a TES medium disposed in the TES loop, an evaporator, a tank, a three-way valve, a subcooler, a first heat exchanger, and a first condenser, the TES loop configured to cool a secondary heat load; a processor; and a primary fluid flow path configured to deliver a primary fluid disposed in the primary fluid flow path to a primary heat load at a substantially constant temperature, the primary fluid flow path comprising: a primary fluid disposed in the primary fluid flow path; a two-phase pump loop ("TPPL"), the TPPL configured to cool the primary heat load by transferring heat from the primary fluid to the TES medium via the first condenser and via the subcooler; a vapor compression system ("VCS") loop configured to transfer heat from the primary fluid in the VCS loop to an ambient environment via a second condenser and to the TES medium via the first heat exchanger, the first heat exchanger downstream of the second condenser; an accumulator configured to separate the primary fluid received from the TPPL and the VCS loop into a vapor-phase primary fluid and a liquid-phase primary fluid, the accumulator in fluid communication with the TPPL and the VCS loop; and an evaporator branch comprising the primary fluid and an evaporator and in fluid communication with the TPPL downstream of the accumulator and with the VCS loop upstream of a compressor; wherein the processor is configured to cause: the TPPL to transfer heat from the primary heat load to the primary fluid; the subcooler to transfer heat from the primary fluid to the TES medium; and the TES loop to transfer heat from the secondary heat load to the TES medium; wherein the first condenser is configured to transfer heat from the primary fluid to the TES medium; wherein the first heat exchanger is configured to transfer heat from the primary fluid to the TES medium; wherein the evaporator is configured to transfer heat from the TES medium to the primary fluid; and wherein the second condenser is configured to transfer heat from the primary fluid to the ambient environment.

A twentieth aspect relates to the heat transfer system of aspect 19, wherein the processor is further configured to cause the three-way valve to maintain a temperature of the TES medium flowing to the secondary heat load by mixing the TES medium flowing from the tank with the TES medium flowing from the subcooler.

A twenty-first aspect relates to the heat transfer system of aspects 19 or 20, wherein the processor is further configured to cause a valve on the evaporator branch to decrease flow of the primary fluid to the evaporator when the primary heat load increases, the valve upstream of the evaporator.

In addition to the features mentioned in each of the independent aspects enumerated above, some examples may show, alone or in combination, the optional features mentioned in the dependent aspects and/or as disclosed in the description above and shown in the figures.

What is claimed is:

1. A method of transferring heat from one or more heat loads to an ambient environment, comprising:
    delivering a primary fluid at a substantially constant temperature disposed in a two-phase pump loop ("TPPL") to a primary heat load;
    transferring heat from the primary heat load to the primary fluid;
    transferring heat from the primary fluid to a first condenser in the TPPL;
    transferring heat from the primary fluid to a thermal energy storage ("TES") medium via a first heat exchanger, the TES medium disposed in a TES loop, a vapor compression system ("VCS") loop comprising the first heat exchanger, wherein the VCS loop is in fluid communication with the TPPL;
    transferring heat from a secondary heat load to the TES medium in the TES loop;
    transferring heat from the TES medium to the primary fluid via an evaporator in an evaporator branch, the evaporator branch downstream of and in fluid communication with the TPPL, the evaporator branch upstream of and in fluid communication with the VCS loop; and
    transferring heat from the primary fluid to the ambient environment via a secondary condenser in the VCS loop, the second condenser upstream of the first heat exchanger.

2. The method of claim 1, wherein the transferring heat from the primary fluid to the first condenser comprises:
    transferring heat from the primary fluid in the TPPL to the TES medium;
    wherein the TPPL is thermally coupled to the TES loop by the first condenser.

3. The method of claim 1, further comprising:
    transferring heat from the primary fluid in the TPPL to the TES medium via a subcooler in the TPPL, the subcooler downstream of an accumulator; and
    separating the primary fluid received from the TPPL and the VCS loop into a vapor-phase primary fluid and a liquid-phase primary fluid via the accumulator, the accumulator in fluid communication with the TPPL and the VCS loop; and
wherein the TPPL is thermally coupled to the TES loop by the subcooler.

4. The method of claim 1, further comprising:
    transferring heat from the primary fluid in the TPPL to the TES medium via a subcooler in the TPPL, the subcooler downstream of an accumulator; and
    separating the primary fluid received from the TPPL and the VCS loop into a vapor-phase primary fluid and a liquid-phase primary fluid via the accumulator, the accumulator in fluid communication with the TPPL and the VCS loop;
    wherein the transferring heat from the primary fluid to the first condenser comprises transferring heat from the primary fluid in the TPPL to the TES medium; and
    wherein the TPPL is thermally coupled to the TES loop by the subcooler and the first condenser.

5. The method of claim 1, further comprising:
    mixing the TES medium flowing from a tank in the TES loop with the TES medium flowing from the first heat exchanger to control the temperature of the TES medium flowing to the secondary heat load.

6. The method of claim 1, further comprising:
    decreasing flow of the primary fluid through a valve on the evaporator branch upstream of the evaporator when the primary heat load increases.

7. The method of claim 1, further comprising:
    turning off a compressor in the VCS loop when the TES medium in a tank in the TES loop cools to a temperature at or below a predetermined temperature set point.

8. The method of claim 1, further comprising:
    cooling the TES medium when the primary heat load decreases by increasing and/or decreasing flow of the primary fluid and/or the TES medium through one or more valves.

9. The method of claim 8, wherein the cooling the TES medium comprises increasing flow of the primary fluid through a valve on the evaporator branch upstream of the evaporator when the primary heat load decreases.

10. The method of claim 8, wherein the cooling the TES medium comprises decreasing flow of the TES medium to the first heat exchanger.

11. The method of claim 10, wherein the cooling the TES medium comprises closing a first TES loop valve upstream of the first heat exchanger.

12. The method of claim 1, further comprising:
    transferring heat from the primary fluid to the TES medium via a second heat exchanger, the TPPL comprising the second heat exchanger, the second heat exchanger disposed in parallel in the TES loop with the first heat exchanger.

13. The method of claim 12, further comprising:
    cooling the TES medium when the primary heat load decreases by increasing and/or decreasing flow of the primary fluid and/or the TES medium through one or more valves.

14. The method of claim 13, wherein the cooling the TES medium comprises increasing flow of the primary fluid through a valve on the evaporator branch upstream of the evaporator when the primary heat load decreases.

15. The method of claim 14, wherein the cooling the TES medium comprises closing a second TES loop valve downstream of the second heat exchanger.

16. A method of transferring heat from one or more loads to an ambient environment, comprising:
    delivering a primary fluid at a substantially constant temperature disposed in a two-phase pump loop ("TPPL") to a primary heat load;
    transferring heat from the primary fluid to a first condenser in the TPPL;
    transferring heat from the primary fluid to a thermal energy storage ("TES") medium via a first heat exchanger, the TES medium disposed in a TES loop, a vapor compression system ("VCS") loop comprising the first heat exchanger, wherein the VCS loop is in fluid communication with the TPPL;

transferring heat from the TES medium to the primary fluid via an evaporator in an evaporator branch, the evaporator branch downstream of and in fluid communication with the TPPL, the evaporator branch upstream of and in fluid communication with the VCS loop; and transferring heat from the primary fluid to the ambient environment via a second condenser in the VCS loop, the second condenser upstream of the first heat exchanger.

17. The method of claim 16, wherein the transferring heat from the primary fluid to the first condenser comprises:

transferring heat from the primary fluid in the TPPL to the TES medium;

wherein the TPPL is thermally coupled to the TES loop by the first condenser.

18. The method of claim 16, wherein the transferring heat from the primary fluid to the first condenser comprises transferring heat from the primary fluid in the TPPL to the TES medium via a subcooler in the TPPL, the subcooler downstream of an accumulator; and wherein the TPPL is thermally coupled to the TES loop by the subcooler and the first condenser.

19. The method of claim 16, further comprising:

mixing the TES medium flowing from a tank in the TES loop with the TES medium flowing from the first heat exchanger to control the temperature of the TES medium flowing to the secondary heat load.

20. A method of transferring heat from one or more loads to an ambient environment, comprising:

delivering a primary fluid at a substantially constant temperature disposed in a two-phase pump loop ("TPPL") to a high transient heat load;

transferring heat from the primary fluid to a first condenser in the TPPL;

transferring heat from the primary fluid to a thermal energy storage ("TES") medium via a first heat exchanger, the TES medium disposed in a TES loop, a vapor compression system ("VCS") loop comprising the first heat exchanger, wherein the VCS loop is in fluid communication with the TPPL;

transferring heat from the TES medium to the primary fluid via an evaporator in an evaporator branch, the evaporator branch downstream of and in fluid communication with the TPPL, the evaporator branch upstream of and in fluid communication with the VCS loop; and transferring heat from the primary fluid to the ambient environment via a second condenser in the VCS loop, the second condenser upstream of the first heat exchanger.

* * * * *